United States Patent
Lee

(10) Patent No.: US 9,128,274 B2
(45) Date of Patent: Sep. 8, 2015

(54) ZOOM LENS SYSTEM

(71) Applicant: SAMSUNG TECHWIN CO., LTD., Changwon (KR)

(72) Inventor: Byoung-Guy Lee, Changwon (KR)

(73) Assignee: Hanwha Techwin Co., Ltd., Changwon (KR)

( * ) Notice: Subject to any disclaimer, the term of this patent is extended or adjusted under 35 U.S.C. 154(b) by 104 days.

(21) Appl. No.: 13/972,471

(22) Filed: Aug. 21, 2013

(65) Prior Publication Data

US 2014/0300974 A1 Oct. 9, 2014

(30) Foreign Application Priority Data

Apr. 4, 2013 (KR) .................. 10-2013-0036985

(51) Int. Cl.
  *G02B 3/02* (2006.01)
  *G02B 15/173* (2006.01)
(52) U.S. Cl.
  CPC .................... *G02B 15/173* (2013.01)
(58) Field of Classification Search
  CPC ........................................... G02B 13/004
  USPC .......................................... 359/715, 773, 687
  See application file for complete search history.

(56) References Cited

U.S. PATENT DOCUMENTS

| | | | |
|---|---|---|---|
| 6,342,973 B1 | 1/2002 | Kikuchi et al. | |
| 7,362,510 B2 | 4/2008 | Nanjo et al. | |
| 2010/0302651 A1* | 12/2010 | Misaka | 359/690 |
| 2011/0242677 A1 | 10/2011 | Lin et al. | |

FOREIGN PATENT DOCUMENTS

| JP | 8-5916 A | 1/1996 |
|---|---|---|
| KR | 2000-0071843 A | 11/2000 |
| KR | 10-2006-0135483 A | 12/2006 |

* cited by examiner

*Primary Examiner* — James Jones
(74) *Attorney, Agent, or Firm* — Sughrue Mion, PLLC

(57) ABSTRACT

Provided is a zoom lens system including: a first lens group having a positive refractive power; a second lens group having a negative refractive power; a third lens group having a positive refractive power; and a fourth lens group having a negative refractive power sequentially from an object side to an image side, wherein a zooming operation is performed by moving the second lens group and the fourth lens group.

19 Claims, 13 Drawing Sheets

FIG. 8
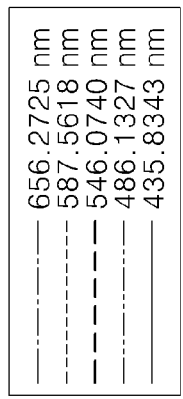
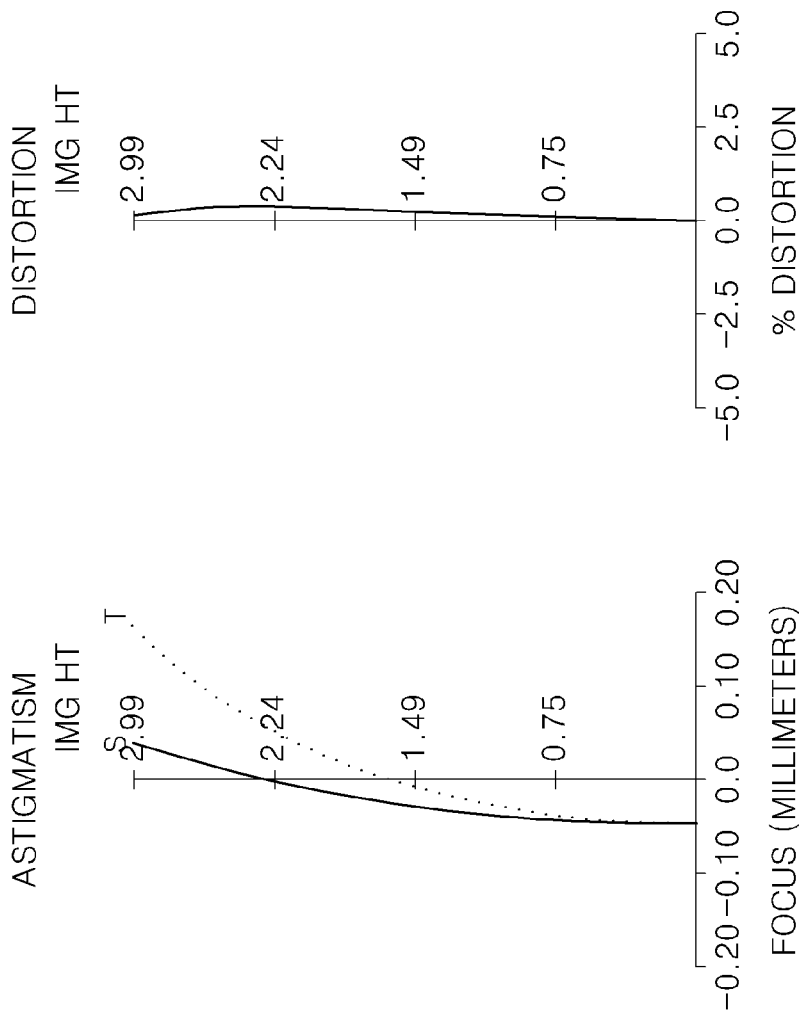
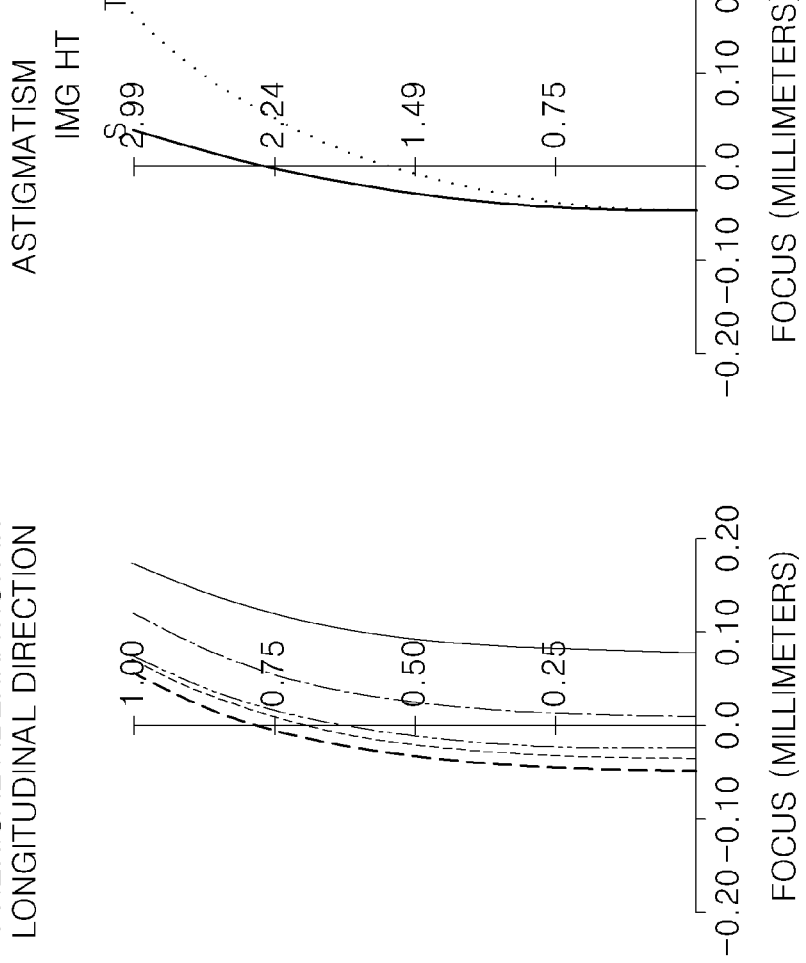

ZOOM LENS SYSTEM

CROSS-REFERENCE TO RELATED PATENT APPLICATION

This application claims priority from Korean Patent Application No. 10-2013-0036985, filed on Apr. 4, 2013, in the Korean Intellectual Property Office, the disclosure of which is incorporated herein in its entirety by reference.

BACKGROUND

1. Field inventive concept Apparatuses and methods consistent with exemplary embodiments relate to a zoom lens system.

2. Description of the Related Art

Photographing/image pickup apparatuses displaying images/pictures by using a charge-coupled device (CCD) or a complementary metal oxide semiconductor (CMOS) are being digitalized, and accordingly, storage capacity increases. As a storage capacity increases, demands for a lens system having high optical performances in a digital photographing/imaging apparatus and demands for small sized apparatus for convenience are increasing.

In a lens system, aberration occurring on a peripheral portion of a screen has to be corrected in order to record small piece of information of a subject clearly. However, to achieve high performance lens system, it is difficult to make a small sized lens system, and in order to manufacture a small sized lens system, manufacturing costs increase. Thus, it is difficult to satisfy both conditions, that is, high optical performances such as a high magnificence and a high resolution and low manufacturing costs.

SUMMARY

The inventive concept provides a zoom lens system including four lens groups.

According to an aspect of an exemplary embodiment, there is provided a zoom lens system including, sequentially from an object side to an image side: a first lens group having a positive refractive power; a second lens group having a negative refractive power; a third lens group having a positive refractive power; and a fourth lens group having a negative refractive power, wherein a zooming operation is performed by moving the second lens group under a following condition:

$$0.25 < f_1/f_t < 0.31,$$

where $f_1$ denote a focal length of the first lens group, and $f_t$ denotes a focal length of the zoom lens system at a telephoto end.

The fourth lens group may include a cemented lens and an independent lens having at least one aspherical surface.

The fourth lens group may satisfy a following condition:

$$0.12 < |f_{43}/f_{4142}| < 0.35$$

where $f_{43}$ denotes a focal length of the independent lens of the fourth lens group, and $f_{4142}$ denotes a focal length of the cemented lens of the fourth lens group.

The fourth lens group may satisfy a following condition:

$$V_{T4} < 50,$$

where $V_{T4}$ denotes an average value of Abbe's numbers of the lenses included in the fourth lens group.

The second lens group may include a first negative lens, a second negative lens, and a positive lens having at least one aspherical surface.

The first negative lens, the second negative lens, and the positive lens may be respectively independent lenses.

The first negative lens, the second negative lens, and the positive lens of the second lens group may satisfy a following condition:

$$0.8 < (V_{21} + V_{23})/V_{22} < 1.2,$$

where $V_{21}$ denotes an Abbe's number of the first negative lens, $V_{22}$ denotes an Abbe's number of the second negative lens, and $V_{23}$ denotes an Abbe's number of the positive lens.

A focal length of the second lens group may satisfy a following condition:

$$1.0 < |f_2/f_w| < 2.0,$$

where $f_2$ denotes a focal length of the second lens group, and $f_w$ denotes a focal length of the zoom lens system at a wide-angle end.

The first lens group may include at least four lenses.

The third lens group may include at least three lenses.

The zoom lens system may satisfy a following condition:

$$30 \leq f_t/f_w,$$

where $f_t$ denotes a focal length of the zoom lens system in a telephoto end, and $f_w$ denotes a focal length of the zoom lens in a wide-angle end.

According to an aspect of another exemplary embodiment, there is provided a zoom lens system including, sequentially from an object side to an image side: a first lens group having a positive refractive power; a second lens group having a negative refractive power; a third lens group having a positive refractive power; and a fourth lens group having a negative refractive power, wherein a zooming operation is performed by moving the second lens group and the fourth lens group, and the fourth lens group comprises a cemented lens and an independent lens and satisfies a following condition:

$$0.12 < |f_{43}/f_{4142}| < 0.35,$$

where $f_{43}$ denotes a focal length of the independent lens of the fourth lens group, and $f_{4142}$ denotes a focal length of the cemented lens of the fourth lens group.

The independent lens of the fourth lens group may include at least one aspherical surface.

The fourth lens group may satisfy a following condition:

$$V_{T4} < 50,$$

where $V_{T4}$ denotes an average value of Abbe's numbers of the lenses included in the fourth lens group.

The first lens group may satisfy a following condition:

$$0.25 < f_1/f_t < 0.31,$$

where $f_1$ denote a focal length of the first lens group, and $f_t$ denotes a focal length of the zoom lens system at a telephoto end.

The second lens group may include a first negative lens, a second negative lens, and a positive lens having at least one aspherical surface, and the first negative lens, the second negative lens, and the positive lens are respectively independent lenses and satisfy a following condition:

$$0.8 < (V_{21} + V_{23})/V_{22} < 1.2$$

where $V_{21}$ denotes an Abbe's number of the first negative lens, $V_{22}$ denotes an Abbe's number of the second negative lens, and $V_{23}$ denotes an Abbe's number of the positive lens.

A focal length of the second lens group may satisfy a following condition:

$$1.0 < |f_2/f_w| < 2.0,$$

where $f_2$ denotes a focal length of the second lens group, and $f_w$ denotes a focal length of the zoom lens system at a wide-angle end.

The first lens group may include at least four lenses.
The third lens group may include a plurality of lenses.
The zoom lens system may satisfy a following condition:

$$30 \leq f_t/f_w,$$

where $f_t$ denotes a focal length of the zoom lens system in the telephoto end, and $f_w$ denotes a focal length of the zoom lens in the wide-angle end.

According to an aspect of still another exemplary embodiment, there is provided a zoom lens system including, sequentially from an object side to an image side: a first lens group having a positive refractive power; a second lens group having a negative refractive power; a third lens group having a positive refractive power; and a fourth lens group having a negative refractive power, wherein a zooming operation is performed by moving the second lens group and the fourth lens group, and wherein each of a lens closest to the image side among lenses of the second lens group, a lens closest to the object side among lenses of the third lens group, and a lens closest to the image side among lenses of the fourth lens group respectively comprises at least one aspherical surface.

BRIEF DESCRIPTION OF THE DRAWINGS

The above and other aspects will become more apparent by describing in detail exemplary embodiments thereof with reference to the attached drawings, in which:

FIG. 8 is a diagram showing a spherical aberration in a longitudinal direction, an astigmatism, and a distortion of the zoom lens system shown in FIG. 6 at a middle end, according to an exemplary embodiment;

DETAILED DESCRIPTION

Figure 1:
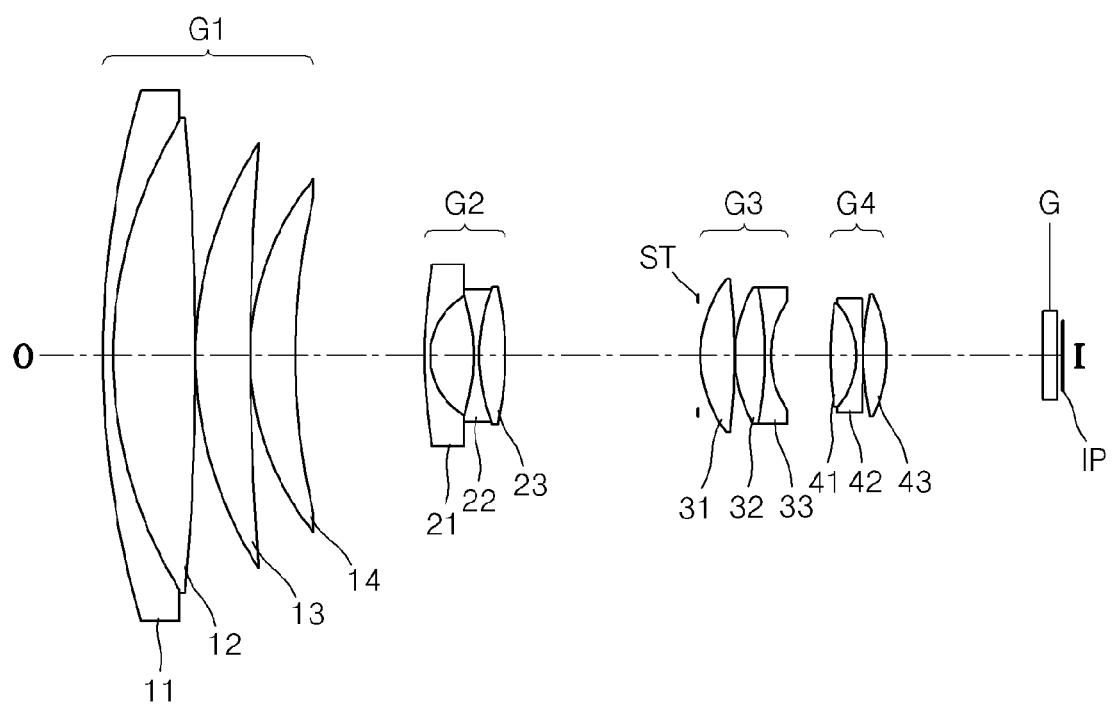
FIG. 1 is a diagram showing a zoom lens system according to an exemplary embodiment.

As the inventive concept allows for various changes and numerous exemplary embodiments, particular exemplary embodiments will be illustrated in the drawings and described in detail in the written description. However, this is not intended to limit the inventive concept to particular modes of practice, and it is to be appreciated that all changes, equivalents, and substitutes that do not depart from the spirit and technical scope of the inventive concept are encompassed in the inventive concept. In the description of the inventive concept, certain detailed explanations of related art are omitted when it is deemed that they may unnecessarily obscure the essence of the invention. While such terms as "first," "second," etc., may be used to describe various components, such components must not be limited to the above terms. The above terms are used only to distinguish one component from another. The terms used in the present specification are merely used to describe particular exemplary embodiments, and are not intended to limit the inventive concept. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

FIG. 1 is a diagram showing a zoom lens system according to an exemplary embodiment.

Referring to FIG. 1, the zoom lens system includes a first lens group G1 having a positive refractive power, a second lens group G2 having a negative refractive power, a third lens group G3 having a positive refractive power, and a fourth lens group G4 having a positive refractive power, which are arranged sequentially from an object side to an image side. An aperture (stop) ST is disposed between the second lens group G2 and the third lens group G3, and an optical block G corresponding to an optical filter or a face plate is disposed between the fourth lens group and an image plane IP.

The zoom lens system according to the present embodiment may perform a zooming operation by moving the second lens group G2 along an optical axis, and at the same time, may perform a focusing operation by moving the fourth lens group G4. The zooming operation and the focusing operation may be performed by utilizing a space between the first lens group G1 and the second lens group G2, and a space between the third lens group G3 and the image plane IP. The second lens group G2 and the fourth lens group G4 move relative to the image plane IP, while the first lens group G1 and the third lens group G3 are fixed with respect to the image plane IP.

In the zoom lens system according to the present embodiment, the first lens group G1 enables the zoom lens system to have sufficient optical performances while realizing a high magnification. For example, the first lens group G1 may include at least four lenses, that is, a first lens 11 having a positive refractive power, a second lens 12 having a negative refractive power, a third lens 13 having a positive refractive power, and a fourth lens 14 having a positive refractive power.

Meanwhile, the first lens group G1 in the zoom lens system of the present embodiment may satisfy following condition to realize the high optical performance, for example, correct chromatic aberration at a telephoto end, while realizing a high magnification and a small size.

$$0.25 < f_1/f_t < 0.31 \quad (1),$$

where $f_1$ denotes a focal length of the first lens group G1, and $f_t$ denotes a focal length at a telephoto end of the zoom lens system.

The above condition 1 defines a ratio between the focal length of the zoom lens system in the telephoto end and the focal length of the first lens group G1. When the ratio exceeds the lowest limit, it is advantageous for forming a small size lens; however, it is difficult to correct a spherical aberration in the telephoto end. When the ratio exceeds the highest limit, it is difficult to form a zoom lens of a high magnification with a small size. For example, if the ratio of the above condition 1 exceeds the highest limit, it is difficult to form the zoom lens system having a high magnification of about 15 times or greater.

The second lens group G2 adjusts a magnification while moving at a zooming operation. The second lens group G2 may include at least three lenses, that is, a fifth lens 21 having a negative refractive power, a sixth lens 22 having a negative refractive power, and a seventh lens 23 having a positive refractive power sequentially from the object side. The fifth through seventh lenses 21, 22, and 23 are all independent lenses. In the present specification, an independent lens is a lens that does not form a cemented lens.

By forming the lenses in the second lens group G2 as the independent lenses, the number of lens surfaces included in the second lens group G2 may be increased, and accordingly, a resolution may be easily adjusted in the zoom lens system of a high magnification.

The lenses forming the second lens group G2 may satisfy following condition.

$$0.8 < (V_{21} + V_{23})/V_{22} < 1.2,$$

where $V_{21}$ denotes an Abbe's number of the fifth lens 21 that is the first lens of the second lens group G2 from the object side, $V_{22}$ denotes an Abbe's number of the sixth lens 22 that is the second lens of the second lens group G2 from the object side, and $V_{23}$ denotes an Abbe's number of the seventh lens 23 that is the third lens of the second lens group G2 from the object side.

The above condition 2 defines a ratio between the Abbe's number of the sixth lens 22 and a sum of the Abbe's number of the fifth lens 21 and the Abbe's number of the seventh lens 23. When the ratio exceeds the lowest limit, a refractive index of the second lens group G2 is reduced, and thus, curvature ratios of the lens surfaces forming the second lens group G2 have to be further reduced, and a lot of aberration that causes degradation in the resolution occurs. In addition, when the ratio of the condition 2 exceeds the highest limit, correction of chromatic aberration is performed with respect to only a certain wavelength band, and it is difficult to correct the chromatic aberration with respect to the entire magnification, that is, from a low magnification to a high magnification.

The seventh lens 23 that is the closest to the image side among the lenses of the second lens group G2 has an object side surface and an image side surface that are respectively convex toward the object side and the image side. The seventh lens 23 may be easily fabricated and manufacturing costs may be reduced. In addition, since the seventh lens 23 has at least one aspherical surface, the astigmatism with respect to the entire magnification may be corrected and the high resolution may be maintained.

The zoom lens system of the present embodiment has a high magnification. A moving distance of the second lens group G2 is increased in order to realize the high magnification, and thus, an entire length of the zoom lens system is increased. Therefore, the moving distance of the second lens group G2 needs to be controlled. For this reason, the second lens group G2 of the zoom lens system according to the present embodiment may satisfy following condition.

$$1.0 < |f_2/f_w| < 2.0 \quad (3),$$

where $f_2$ denotes a focal length of the second lens group G2, and $f_w$ denotes a focal length of the zoom lens system at a wide-angle end.

The above condition 3 defines an absolute value of a ratio between the focal length of the zoom lens system in the wide-angle end and the focal length of the second lens group G2. When the value of the condition 3 exceeds the lowest limit, it may be advantageous for the small size, comatic aberration and a field curvature increase. In addition, when the value of the condition 3 exceeds the highest limit, the moving distance of the second lens group G2 increases when realizing a high magnification, and thus, it may be difficult to form a small size lens, that is, the size of the lens, for example, a diameter of the lens increases.

The third lens group G3 may include at least three lenses in order to stabilized optical performance by adjusting a resolution of the zoom lens system and reducing influence of a mounting error generated in manufacturing processes. For example, the third lens group G3 includes an eighth lens 31 having a positive refractive power, a ninth lens 32 having a positive refractive power, and a tenth lens 33 having a negative refractive power. The eighth lens 31 is an independent lens; however, the ninth lens 32 and the tenth lens 33 may form a cemented lens. The eighth lens 31 that is the closest to the object side among the lenses of the third lens group G3 may have at least one aspherical surface. Since the eighth lens 31 includes the aspherical lens, peripheral resolution may be maintained at the wide-angle end.

The fourth lens group G4 may perform a focusing operation while moving with the second lens group G2. The fourth lens group G4 may include an eleventh lens 41 having a positive refractive power, a twelfth lens 42 having a negative refractive power, and a thirteenth lens 43 having a positive refractive power. The eleventh lens 41 and the twelfth lens 42 form a cemented lens, and may easily correct chromatic aberration in the telephoto end. The thirteenth lens 43 that is closest to the image side among the lenses of the fourth lens group G4 is an independent lens, and may include at least one aspherical surface. Since the independent lens of the fourth lens group G4 has the positive refractive power and the aspherical surface, the resolution may be ensured throughout the entire magnification from wide angle end to the telephoto end while performing the focusing operation.

Meanwhile, the fourth lens group G4 may satisfy following condition.

$$0.12 < |f_{43}/f_{4142}| < 0.35 \quad (4),$$

where $f_{43}$ denotes a focal length of the thirteenth lens 43 that is the independent lens, and $f_{4142}$ denotes a focal length of the cemented lens of the fourth lens group G4.

The condition 4 defines a ratio between the focal length of the cemented lens included in the fourth lens group G4 and the focal length of the independent lens. When the ratio of the condition 4 exceeds the lowest limit, lateral chromatic aberration largely increases in the high magnification section of the zoom lens system according to the present embodiment. When the ratio of the condition 4 exceeds the highest limit, the refractive power of the thirteenth lens 43 that is the aspherical lens increases, thereby degrading resolution.

The fourth lens group G4 moves during the zooming operation, and at this time, the fourth lens group G4 may satisfy following condition so that variation of chromatic aberration may be reduced while moving.

$$V_{T4} < 50 \quad (5),$$

where $V_{T4}$ denotes an average of the Abbe's numbers of the lenses in the fourth lens group G4.

The condition 5 defines the average value of the Abbe's numbers of the lenses in the fourth lens group G4. When the average value of the Abbe's numbers of the lenses in the fourth lens group G4 is equal to or greater than 50, the variation of chromatic aberration according to a movement of the fourth lens group G4 increases, thereby degrading the resolution.

According to the zoom lens system of the present embodiment, which satisfies the above conditions, the high magnification may be obtained while ensuring high resolution from the wide-angle end to the telephoto end, and at the same time, the size of the zoom lens system may be miniaturized. For example, the zoom lens system of the present embodiment may satisfy following condition.

$$30 \leq f_t/f_w \quad (6),$$

where $f_t$ denotes a focal length of the zoom lens system in the telephoto end, and $f_w$ denotes a focal length of the zoom lens system in the wide-angle end.

The condition 6 defines a magnification of the zoom lens system according to the present embodiment, and the zoom lens system of the present embodiment may realize a high magnification of about 30 times or greater.

The zoom lens system having excellent optical performances may be used as an imaging optics in an imaging apparatus such as a surveillance camera, a digital video camera, and a digital still camera. The imaging apparatus including the zoom lens system according to the present embodiment may have a configuration, in which light incident from an object side of the zoom lens system is finally focused on a solid imaging device disposed on an image plane. The solid imaging device may be a charge-coupled device (CCD) or a complementary metal-oxide semiconductor device (CMOS).

The aspherical surface of the zoom lens in the present embodiment is defined as follows.

The aspherical surface of the zoom lens according to the present embodiment may be represented by following equation, when x-axis denotes an optical axis direction, y-axis denotes a direction perpendicular to the optical axis direction, and a proceeding direction of a ray is a positive direction. Here, x denotes a distance from a vertex of a lens in an optical axis direction, and y denotes a distance in a direction perpendicular to the optical axis direction. k denotes a conic constant and A, B, C, and D denote aspheric coefficients, and c denotes a reciprocal of a radius of curvature, 1/R, at the vertex of the lens.

$$x = \frac{cy^2}{1 + \sqrt{1 - (k+1)c^2 y^2}} + Ay^4 + By^6 + Cy^8 + Dy^{10}$$

Design data of the zoom lens system according to present embodiment is as follows.

Hereinafter, f denotes a focal length of the entire zoom lens, F/# denotes the F number, and D7, D13, D19, and D24 denote variable distances. Rn denotes a radius of curvature, and Dn denotes an interval between a lens surface and another lens surface on an optical axis. That is, Dn denotes a thickness of lens or a distance between a lens and another lens. In addition, nd denotes a refractive index of a material, vd denotes an Abbe's number of the material, and * denotes an aspherical surface.

First Embodiment

Figure 2:
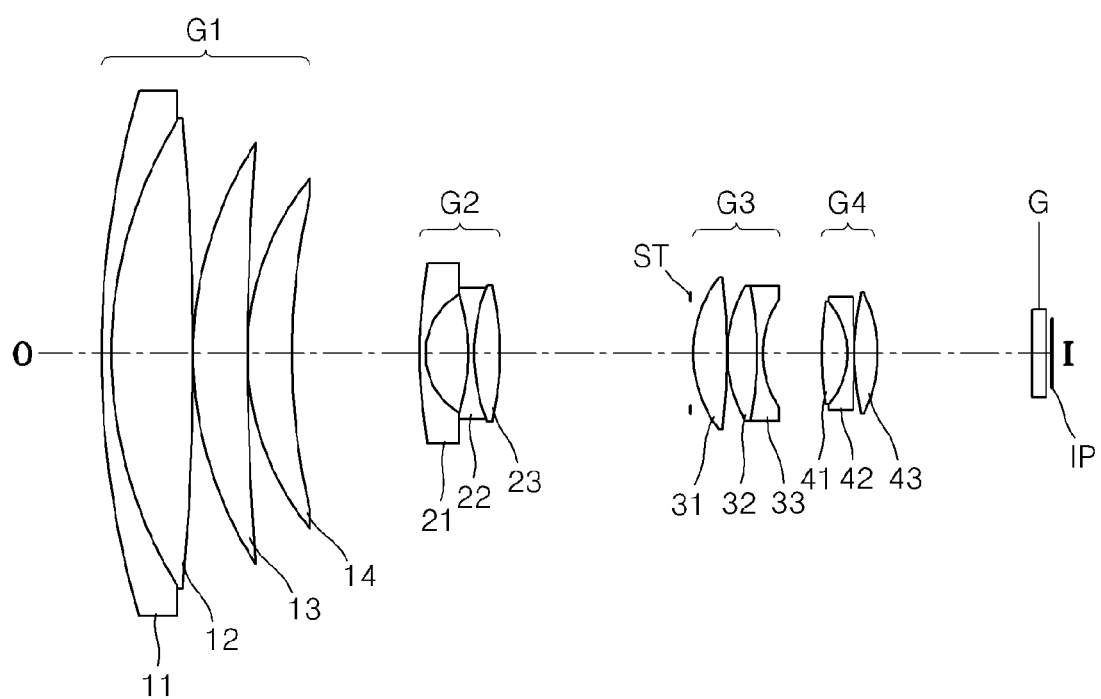
FIG. 2 is diagram showing a zoom lens system according to an exemplary embodiment.

Table 1 shows design data of the zoom lens system according to an exemplary embodiment as shown in FIG. 2.

TABLE 1

| Surface no. | Rn | Dn | nd | vd |
|---|---|---|---|---|
| 1 | 85.381 | 1.000 | 1.903658 | 31.315 |
| 2 | 40.300 | 7.280 | 1.496997 | 81.6084 |
| 3 | −287.471 | 0.150 | | |
| 4 | 36.376 | 4.680 | 1.496997 | 81.6084 |
| 5 | 171.234 | 0.150 | | |
| 6 | 25.733 | 4.060 | 1.496997 | 81.6084 |
| 7 | 63.517 | variable | | |
| 8 | 51.322 | 0.500 | 1.910822 | 35.25 |
| 9 | 6.072 | 3.800 | | |
| 10 | −20.352 | 0.500 | 1.7725 | 49.6243 |
| 11 | 14.009 | 0.200 | | |
| 12* | 14.511 | 2.230 | 2.0017 | 19.324 |
| 13* | −237.865 | variable | | |
| ST | INFINITY | 0.400 | | |
| 15* | 11.630 | 2.950 | 1.8061 | 40.7306 |
| 16* | −63.297 | 0.100 | | |
| 17 | 12.826 | 2.630 | 1.496997 | 81.6084 |
| 18 | −27.546 | 0.450 | 1.903658 | 31.315 |
| 19 | 8.503 | variable | | |
| 20 | 35.273 | 2.420 | 1.589129 | 61.2526 |
| 21 | −7.359 | 0.500 | 1.850249 | 32.1701 |
| 22 | −161.102 | 0.150 | | |
| 23* | 31.188 | 1.970 | 1.820798 | 42.7064 |
| 24* | −14.440 | variable | | |
| 25 | INFINITY | 1.300 | 1.516798 | 64.1983 |
| 26 | INFINITY | 0.500 | | |

Table 2 shows aspherical coefficients of the zoom lens system shown in FIG. 2, and table 3 shows the focal length f, the F number F/#, and variable distances D7, D13, D19, and D24 of the zoom lens system shown in FIG. 2. Also, table 4 shows focal lengths of the lenses in the zoom lens system, and in table 4, focal lengths of cemented lenses are $f_{11}f_{12}$, $f_{32}$, $f_{22}$, $f_{41}f_{42}$.

TABLE 2

| Surface no. | K | A | B | C | D |
|---|---|---|---|---|---|
| 12 | 0 | −2.15E−06 | −1.66E−06 | 1.08E−07 | −6.55E−09 |
| 13 | 0 | −8.69E−05 | 3.61E−06 | −1.81E−08 | −4.46E−09 |
| 15 | 0 | −2.01E−05 | 2.61E−07 | −2.19E−07 | −8.17E−11 |
| 16 | 0 | −8.69E−05 | 6.07E−08 | −8.17E−09 | 1.10E−10 |
| 23 | 0 | −9.87E−05 | 4.55E−06 | −2.19E−07 | 1.07E−09 |
| 24 | 0 | −4.80E−05 | 3.61E−06 | −1.54E−07 | −8.17E−11 |

TABLE 3

| | F | F/# | D7 | D13 | D19 | D24 |
|---|---|---|---|---|---|---|
| Wide-angle end | 4.4 | 1.600 | 0.500 | 28.200 | 8.300 | 11.100 |
| Middle end | 85 | 3.500 | 26.200 | 2.600 | 9.800 | 9.600 |
| Telephoto end | 142 | 4.500 | 27.000 | 1.800 | 16.200 | 3.100 |

TABLE 4

| | |
|---|---|
| $f_{11}f_{12}$ | 413.701075 |
| $f_{13}$ | 91.6052 |
| $f_{14}$ | 83.790889 |
| $f_{21}$ | −7.492486 |
| $f_{22}$ | −11.060718 |
| $f_{23}$ | 13.549851 |
| $f_{31}$ | 12.01925 |
| $f_{32}f_{33}$ | −13.473339 |
| $f_{41}f_{42}$ | −74.444625 |
| $f_{43}$ | 12.197 |
| $f_1$ | 42.1 |
| $f_2$ | −6.35 |

Figure 3:
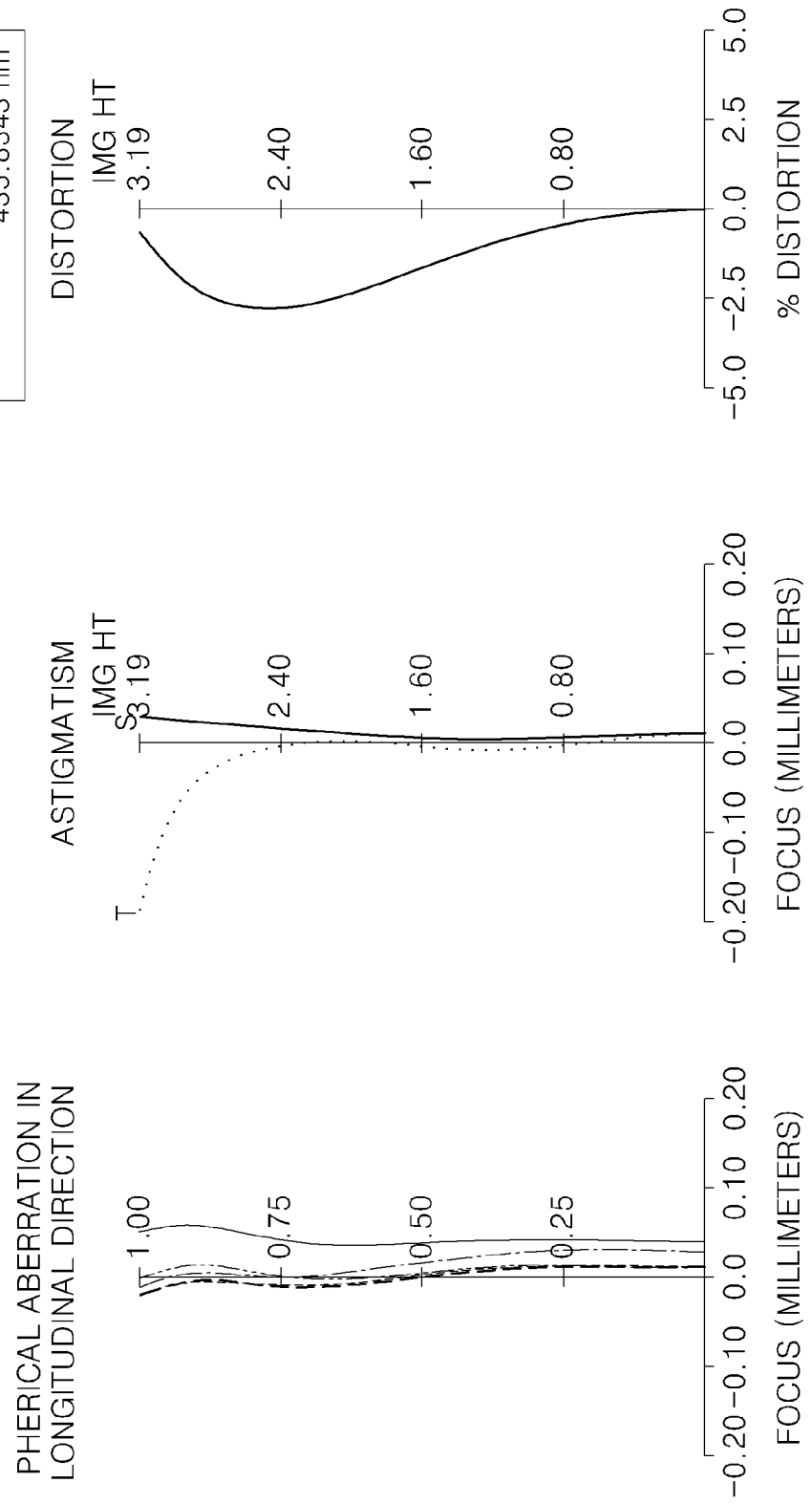
FIG. 3 is a diagram showing a spherical aberration in a longitudinal direction, an astigmatism, and a distortion of the zoom lens system shown in FIG. 2 at a wide-angle end, according to an exemplary embodiment.
Figure 4:
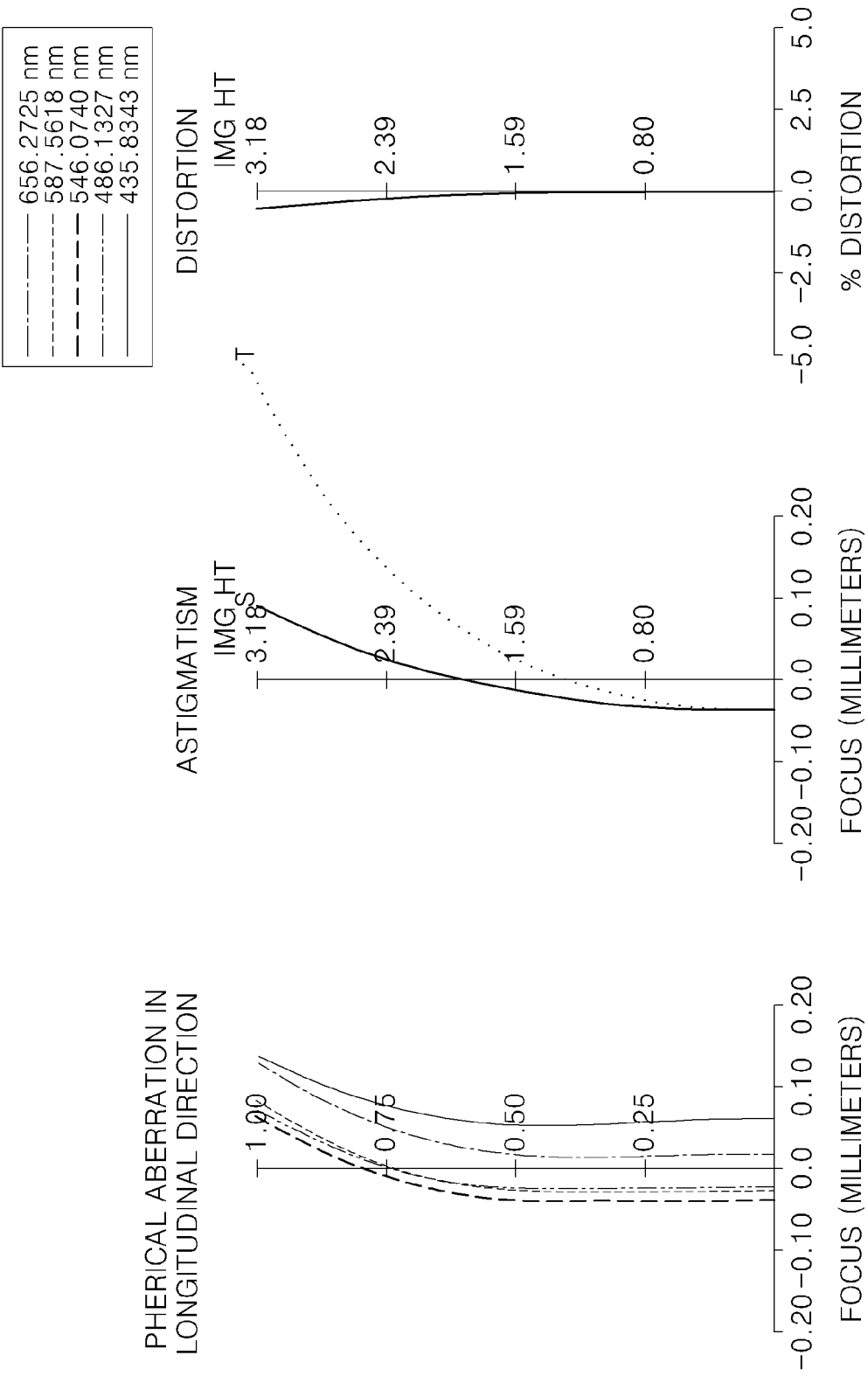
FIG. 4 is a diagram showing a spherical aberration in a longitudinal direction, an astigmatism, and a distortion of the zoom lens system shown in FIG. 2 at a middle end, according to an exemplary embodiment.
Figure 5:
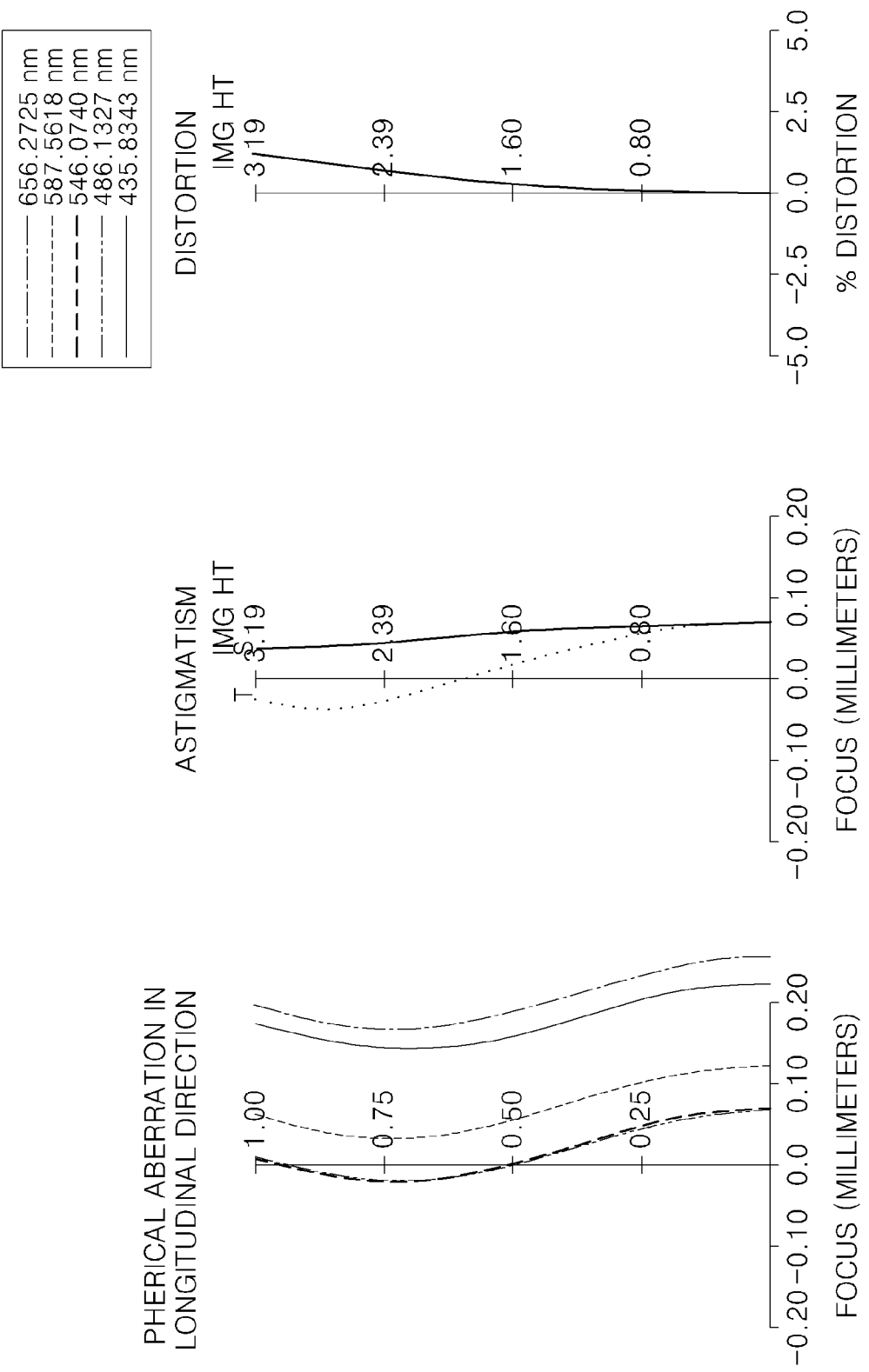
FIG. 5 is a diagram showing a spherical aberration in a longitudinal direction, an astigmatism, and a distortion of the zoom lens system shown in FIG. 2 at a telephoto end, according to an exemplary embodiment.

FIG. 3 is a diagram showing a spherical aberration in a longitudinal direction, an astigmatism, and a distortion of the zoom lens system shown in FIG. 2 at a wide-angle end, FIG. 4 is a diagram showing a spherical aberration in a longitudinal direction, an astigmatism, and a distortion of the zoom lens system shown in FIG. 2 at a middle end, and FIG. 5 is a diagram showing a spherical aberration in a longitudinal direction, an astigmatism, and a distortion of the zoom lens system shown in FIG. 2 at a telephoto end.

In FIGS. 3 and 4, the longitudinal spherical aberration is shown with respect to light having wavelengths of about 656.2725 nm, 587.5618 nm, 546.0740 nm, 486.1327 nm, and 435.8343 nm, and the astigmastism and distortion are shown with respect to light having wavelength of about 546.0740 nm.

Second Embodiment

Figure 6:
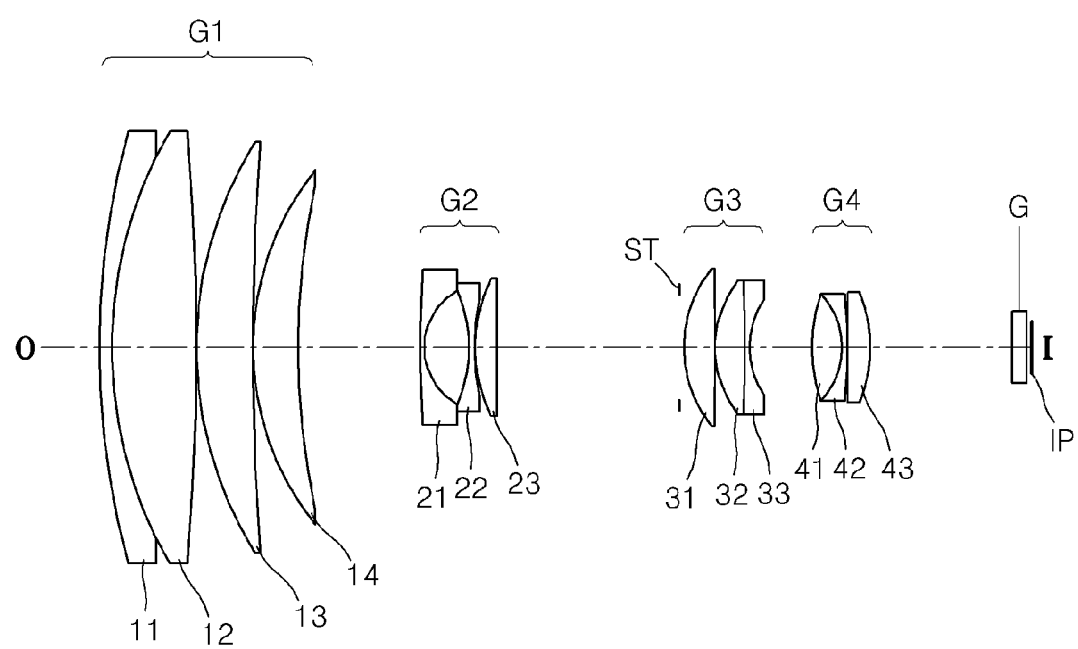
FIG. 6 is a diagram showing a zoom lens system according to another exemplary embodiment.

Table 5 shows design data of a zoom lens system shown in FIG. 6 according to an exemplary embodiment.

TABLE 5

| Surface no. | Rn | Dn | nd | vd |
|---|---|---|---|---|
| 1 | 79.709 | 1.000 | 1.903658 | 31.315 |
| 2 | 38.958 | 7.765 | 1.496997 | 81.6084 |
| 3 | −308.650 | 0.150 | | |
| 4 | 36.183 | 5.116 | 1.496997 | 81.6084 |
| 5 | 200.720 | 0.150 | | |
| 6 | 26.056 | 4.089 | 1.496997 | 81.6084 |
| 7 | 64.577 | variable | | |
| 8 | 70.377 | 0.500 | 1.882023 | 37.2213 |
| 9 | 6.028 | 4.025 | | |
| 10 | −14.102 | 0.500 | 1.7725 | 496243 |
| 11 | 24.431 | 0.150 | | |
| 12* | 15.633 | 2.048 | 2.0017 | 19.317 |
| 13* | −417.451 | variable | | |
| ST | INFINITY | 0.400 | | |
| 15* | 11.599 | 2.840 | 1.8061 | 40.7306 |
| 16* | −122.663 | 0.100 | | |
| 17 | 10.129 | 2.685 | 1.496997 | 81.6084 |
| 18 | −171.110 | 0.450 | 1.903658 | 31.315 |
| 19 | 7.523 | variable | | |
| 20 | 14.606 | 2.737 | 1.58913 | 61.2509 |
| 21 | −7.622 | 0.500 | 1.850249 | 32.1701 |
| 22 | −93.531 | 0.150 | | |
| 23 | −129.147 | 2.000 | 1.834805 | 42.7218 |
| 24* | −13.489 | variable | | |
| 25 | INFINITY | 1.300 | 1.516798 | 64.1983 |
| 26 | INFINITY | 0.500 | | |

Table 6 shows aspherical coefficients of the zoom lens system shown in FIG. 6, and table 7 shows the focal length f, the F number F/#, and variable distances D7, D13, D19, and D24 of the zoom lens system shown in FIG. 6. Also, table 8 shows focal lengths of the lenses in the zoom lens system, and in table 4, focal lengths of cemented lenses are $f_{11}f_{12}$, $f_{32}$, $f_{22}$, $f_{41}f_{42}$.

TABLE 6

| Surface no. | K | A | B | C | D |
|---|---|---|---|---|---|
| 12 | 0 | 3.80E−04 | −1.19E−05 | 1.44E−07 | −6.86E−10 |
| 13 | 0 | 3.63E−04 | −9.94E−07 | 5.08E−08 | −1.25E−08 |
| 15 | 0 | −2.23E−05 | 2.08E−07 | −1.67E−08 | 3.38E−10 |
| 16 | 0 | 5.21E−05 | −3.89E−07 | 4.26E−09 | 1.27E−10 |
| 24 | 0 | −7.79E−05 | 6.96E−07 | 2.99E−09 | 0.00E+00 |

TABLE 7

| | f | F/# | D7 | D13 | D19 | D24 |
|---|---|---|---|---|---|---|
| Wide-angle end | 4.59 | 1.63 | 0.5 | 27.54 | 8.71 | 10.17 |
| Middle end | 85.32 | 3.5 | 25.48 | 2.55 | 9.64 | 9.19 |
| Telephoto end | 130.1 | 4.54 | 26.23 | 1.8 | 15.67 | 3.17 |

TABLE 8

| | |
|---|---|
| $f_{11}f_{12}$ | 398.838 |
| $f_{13}$ | 87.646 |
| $f_{14}$ | 84.643 |
| $f_{21}$ | −7.455 |
| $f_{22}$ | −11.454 |
| $f_{23}$ | 14.883 |
| $f_{31}$ | 13.194 |
| $f_{32}f_{33}$ | −16.128 |
| $f_{41}f_{42}$ | 60.102 |
| $f_{43}$ | 17.803 |
| $f_1$ | 39.8 |
| $f_2$ | −6.3 |

Figure 7:
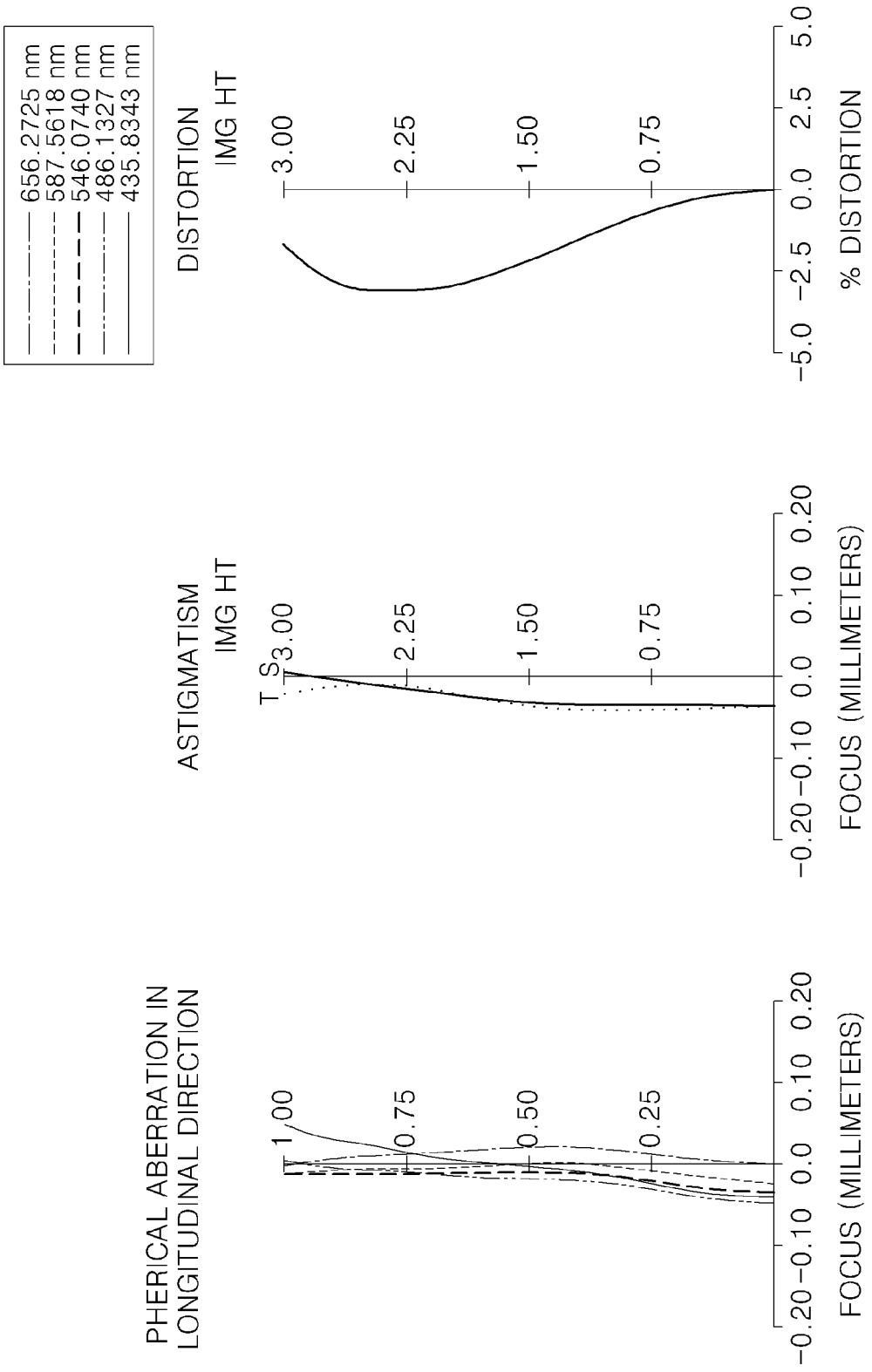
FIG. 7 is a diagram showing a spherical aberration in a longitudinal direction, an astigmatism, and a distortion of the zoom lens system shown at FIG. 6 in a wide-angle end, according to an exemplary embodiment.
Figure 9:
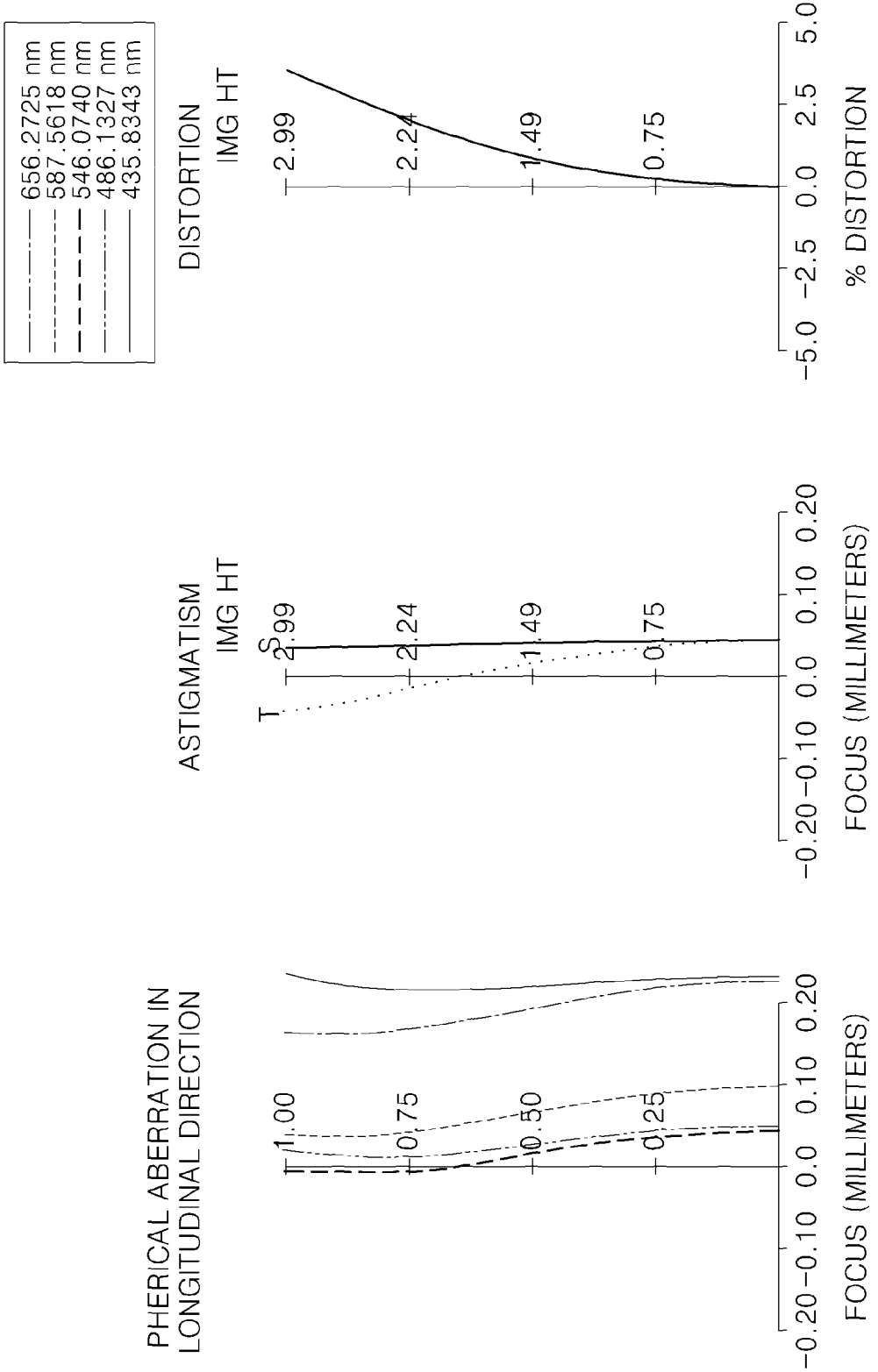
FIG. 9 is a diagram showing a spherical aberration in a longitudinal direction, an astigmatism, and a distortion of the zoom lens system shown in FIG. 6 at a telephoto end, according to an exemplary embodiment.

FIG. 7 is a diagram showing a spherical aberration in a longitudinal direction, an astigmatism, and a distortion of the zoom lens system shown in FIG. 6 at a wide-angle end, FIG. 8 is a diagram showing a spherical aberration in a longitudinal direction, an astigmatism, and a distortion of the zoom lens system shown in FIG. 6 at a middle end, and FIG. 9 is a diagram showing a spherical aberration in a longitudinal direction, an astigmatism, and a distortion of the zoom lens system shown in FIG. 6 at a telephoto end.

In FIGS. 7 through 9, the longitudinal spherical aberration is shown with respect to light having wavelengths of about 656.2725 nm, 587.5618 nm, 546.0740 nm, 486.1327 nm, and 435.8343 nm, and the astigmastism and distortion are shown with respect to light having wavelength of about 546.0740 nm.

Third Embodiment

Figure 10:
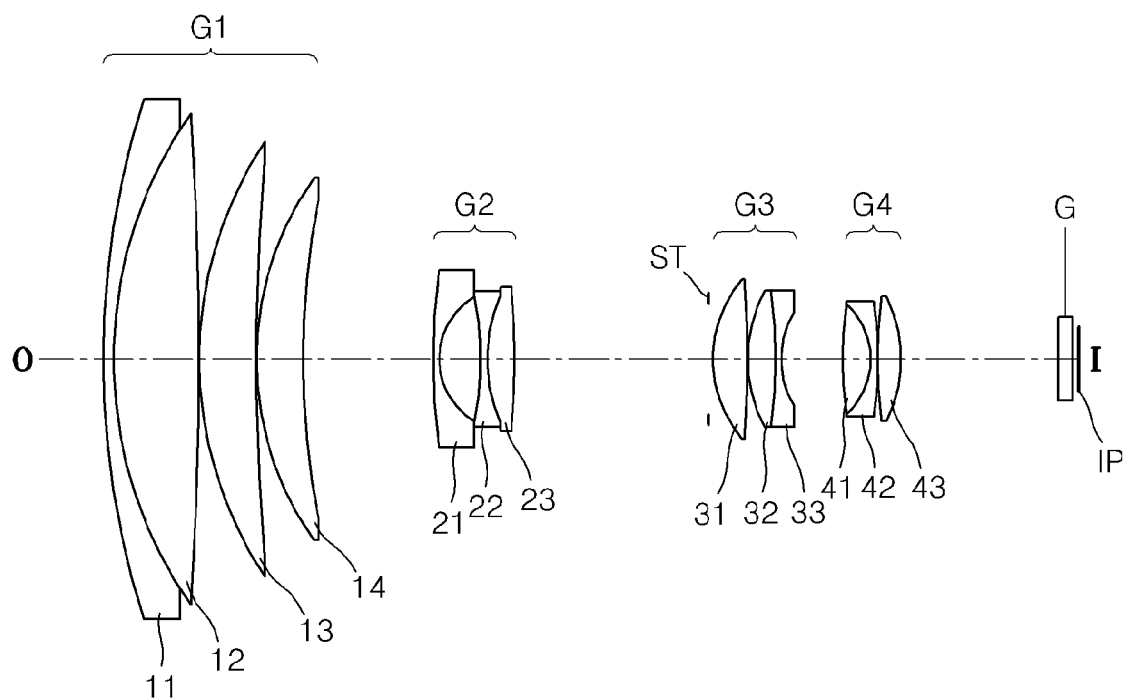
FIG. 10 is a diagram showing a zoom lens system according to another exemplary embodiment.

Table 9 shows design data of a zoom lens system shown in FIG. 10 according to an exemplary embodiment.

TABLE 9

| Surface no. | Rn | Dn | nd | vd |
|---|---|---|---|---|
| 1 | 75.178 | 1.000 | | |
| 2 | 38.236 | 7.420 | 1.496997 | 81.6084 |

TABLE 9-continued

| Surface no. | Rn | Dn | nd | vd |
|---|---|---|---|---|
| 3 | −421.901 | 0.150 | | |
| 4 | 35.484 | 4.899 | 1.496997 | 81.6084 |
| 5 | 172.050 | 0.150 | | |
| 6 | 27.243 | 3.989 | 1.496997 | 81.6084 |
| 7 | 68.654 | variable | | |
| 8 | 62.588 | 0.500 | 1.910822 | 35.25 |
| 9 | 6.119 | 3.660 | | |
| 10 | −33.091 | 0.500 | 1.7725 | 49.6243 |
| 11 | 12.788 | 0.200 | | |
| 12* | 13.339 | 2.267 | 2.0017 | 19.324 |
| 13* | 188.970 | variable | | |
| ST | INFINITY | 0.400 | 1.903658 | 31.315 |
| 15* | 10.943 | 2.955 | 1.8061 | 40.7306 |
| 16* | −64.087 | 0.100 | | |
| 17 | 12.686 | 2.476 | 1.496997 | 81.6084 |
| 18 | −39.368 | 0.450 | 1.903658 | 31.315 |
| 19 | 7.970 | variable | | |
| 20 | 47.442 | 2.524 | 1.589129 | 61.2526 |
| 21 | −6.389 | 0.500 | 1.850249 | 32.1701 |
| 22 | −59.644 | 0.150 | | |
| 23* | 37.377 | 2.016 | 1.820798 | 42.7064 |
| 24* | −13.242 | variable | | |
| 25 | INFINITY | 1.300 | 1.516798 | 64.1983 |
| 26 | INFINITY | 0.500 | | |

Table 10 shows aspherical coefficients of the zoom lens system shown in FIG. 10, and table 11 shows the focal length f, the F number F/#, and variable distances D7, D13, D19, and D24 of the zoom lens system shown in FIG. 10. Also, table 12 shows focal lengths of the lenses in the zoom lens system, and in table 12, focal lengths of cemented lenses are $f_{11}f_{12}$, $f_{32}$, $f_{22}$, $f_{41}f_{42}$.

TABLE 10

| Surface no. | K | A | B | C | D |
|---|---|---|---|---|---|
| 12 | 0 | −7.20E−05 | 1.99E−06 | −7.18E−09 | −4.97E−09 |
| 13 | 0 | −1.91E−04 | 3.12E−06 | −9.69E−08 | −4.13E−09 |
| 15 | 0 | −2.69E−05 | 2.11E−07 | −1.31E−08 | 1.68E−10 |
| 16 | 0 | 7.20E−05 | 1.02E−07 | −1.34E−08 | 1.85E−10 |
| 23 | 0 | −1.41E−04 | 4.78E−06 | −1.91E−07 | 1.04E−09 |
| 24 | 0 | −1.10E−04 | 4.81E−06 | −1.66E−07 | 3.71E−10 |

TABLE 11

| | f | F/# | D7 | D13 | D19 | D24 |
|---|---|---|---|---|---|---|
| Wide-angle end | 4.6 | 1.630 | 0.500 | 28.260 | 8.160 | 11.050 |
| Middle end | 85.56 | 3.500 | 26.170 | 2.580 | 9.600 | 9.580 |
| Telephoto end | 142.15 | 4.540 | 26.950 | 1.800 | 16.480 | 2.730 |

TABLE 12

| | |
|---|---|
| $f_{11}f_{12}$ | 389.229 |
| $f_{13}$ | 88.626 |
| $f_{14}$ | 87.799 |
| $f_{21}$ | −7.427 |
| $f_{22}$ | −11.826 |
| $f_{23}$ | 14.064 |
| $f_{31}$ | 11.735 |
| $f_{32}f_{33}$ | −13.069 |
| $f_{41}f_{42}$ | −71.337 |
| $f_{43}$ | 12.064 |
| $f_1$ | 40.67 |
| $f_2$ | −6.6 |

Figure 11:
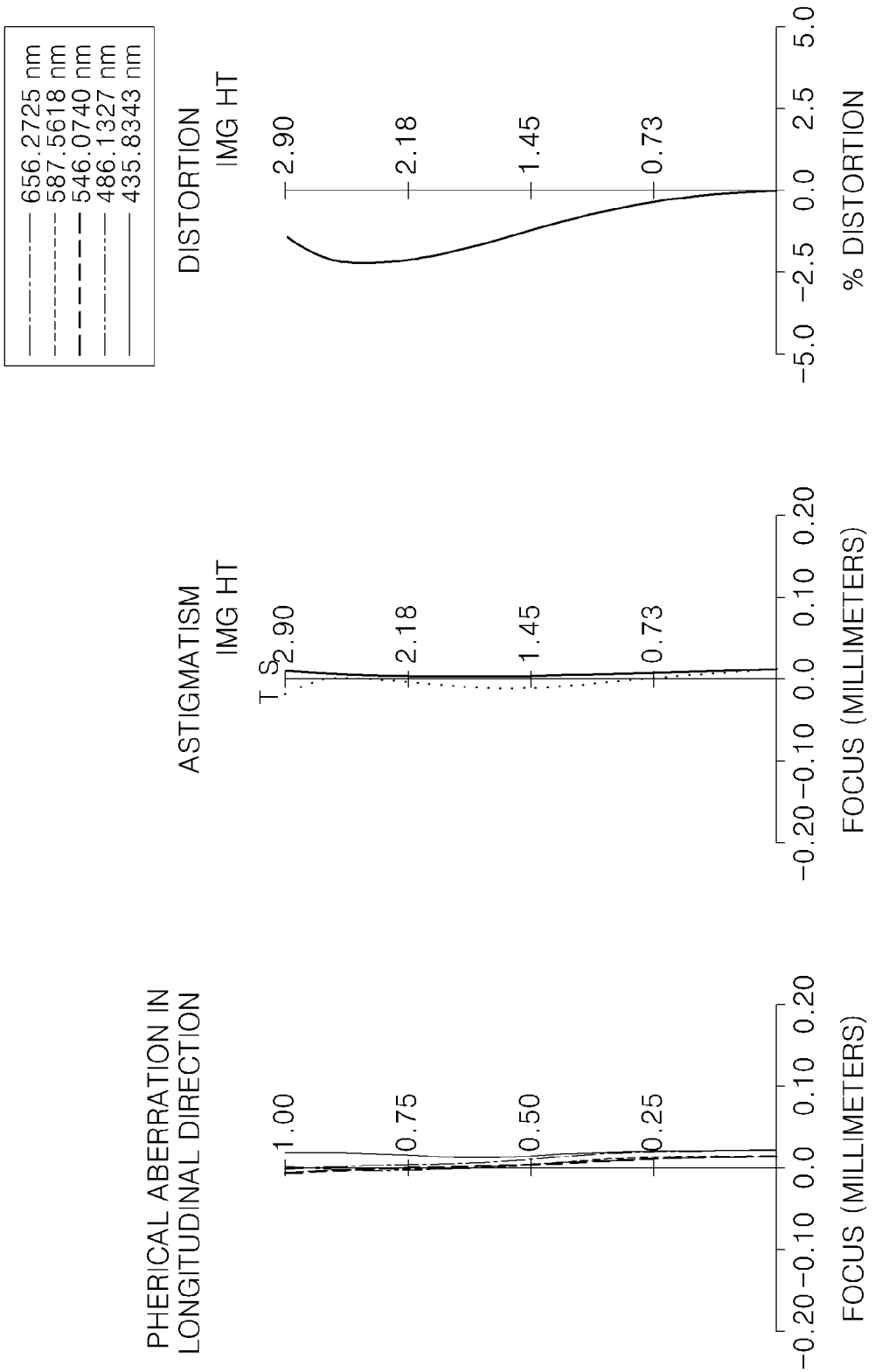
FIG. 11 is a diagram showing a spherical aberration in a longitudinal direction, an astigmatism, and a distortion of the zoom lens system shown in FIG. 10 at a wide-angle end, according to an exemplary embodiment.
Figure 12:
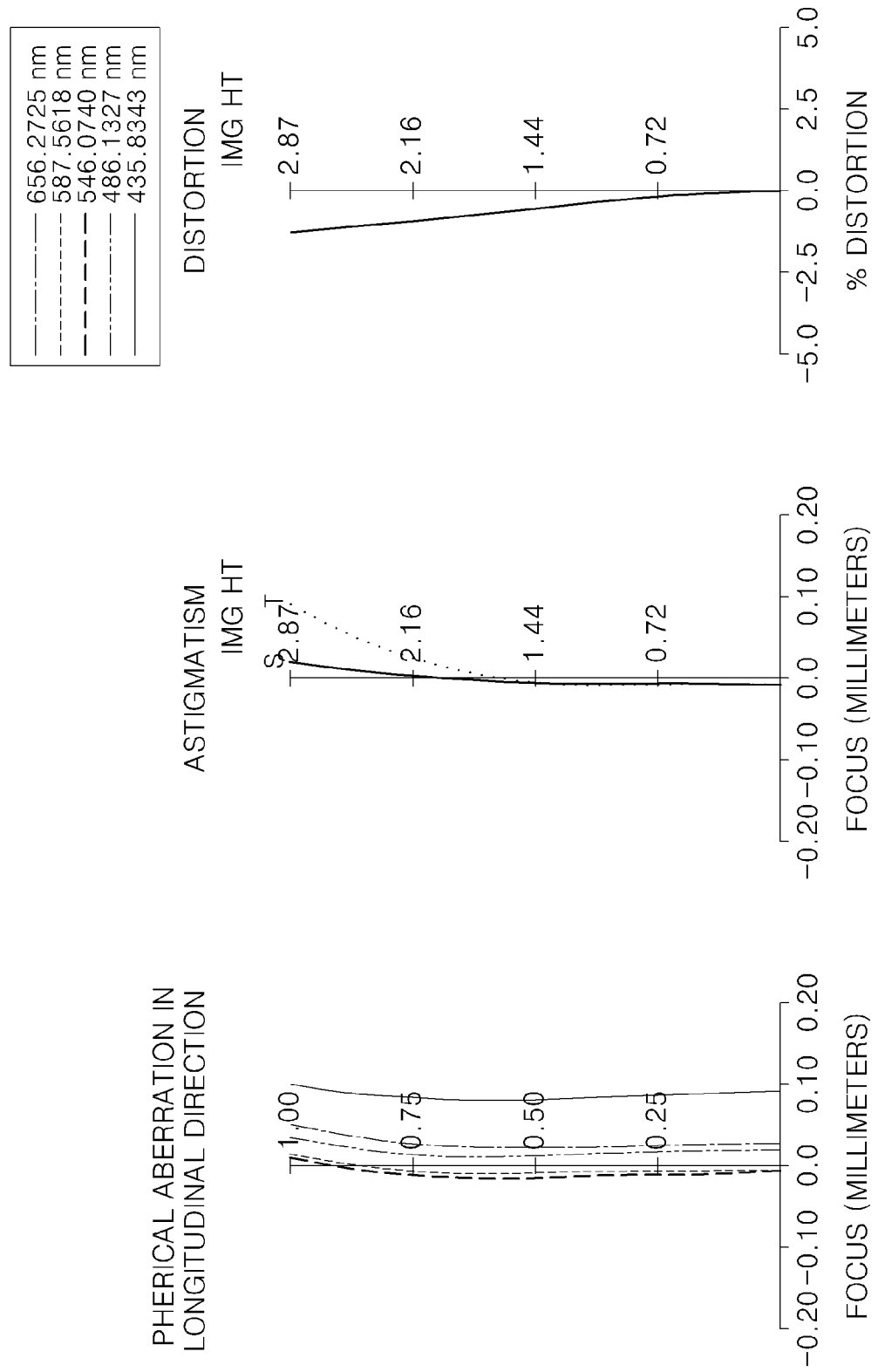
FIG. 12 is a diagram showing a spherical aberration in a longitudinal direction, an astigmatism, and a distortion of the zoom lens system shown in FIG. 10 at a middle end, according to an exemplary embodiment.
Figure 13:
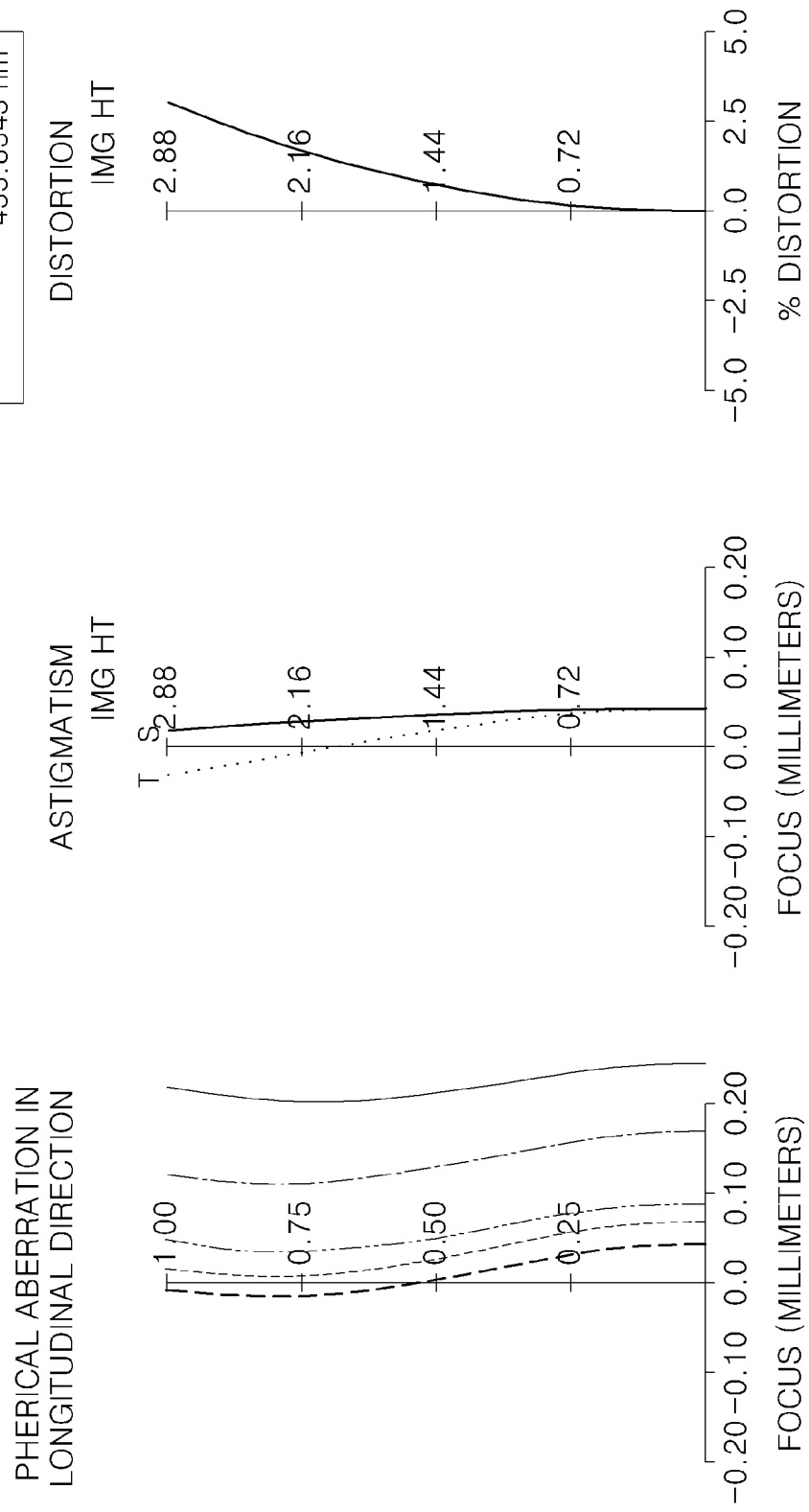
FIG. 13 is a diagram showing a spherical aberration in a longitudinal direction, an astigmatism, and a distortion of the zoom lens system shown in FIG. 10 at a telephoto end, according to an exemplary embodiment.

FIG. 11 is a diagram showing a spherical aberration in a longitudinal direction, an astigmatism, and a distortion of the zoom lens system shown in FIG. 10 at a wide-angle end, FIG. 12 is a diagram showing a spherical aberration in a longitudinal direction, an astigmatism, and a distortion of the zoom lens system shown in FIG. 10 at a middle end, and FIG. 13 is a diagram showing a spherical aberration in a longitudinal direction, an astigmatism, and a distortion of the zoom lens system shown in FIG. 10 at a telephoto end.

In FIGS. 11 through 13, the longitudinal spherical aberration is shown with respect to light having wavelengths of about 656.2725 nm, 587.5618 nm, 546.0740 nm, 486.1327 nm, and 435.8343 nm, and the astigmastism and distortion are shown with respect to light having wavelength of about 546.0740 nm.

Table 13 shows that the zoom lens system according to the above embodiments satisfies the above conditions.

TABLE 13

| | First embodiment | Second embodiment | Third embodiment |
|---|---|---|---|
| Condition 1<br>$0.25 < f_1/f_t < 0.31$ | 0.296 | 0.306 | 0.286 |
| Condition 2<br>$0.8 < (V_{21} + V_{23})/V_{22} < 1.2$ | 1.10 | 1.14 | 1.10 |
| Condition 3<br>$1.0 < |f_2/f_w| < 2.0$ | 1.44 | 1.37 | 1.43 |
| Condition 4<br>$0.12 < |f_{43}/f_{4142}| < 0.35$ | 0.16 | 0.30 | 0.17 |
| Condition 5<br>$V_{T4} < 50$ | 45.4 | 45.40 | 45.38 |
| Condition 6<br>$30 \leq f_t/f_w$ | 32.27 | 28.34 | 30.90 |

According to the above embodiment of the inventive concept, the zoom lens system of a small size capable of realizing a high magnification and a high resolution may be manufactured.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A zoom lens system comprising, sequentially from an object side to an image side:
   a first lens group having a positive refractive power;
   a second lens group having a negative refractive power;
   a third lens group having a positive refractive power; and
   a fourth lens group having a negative refractive power,
   wherein a zooming operation is performed by moving the second lens group and the fourth lens group under a following condition:

$$0.25 < f_1/f_t < 0.31,$$

where $f_1$ denote a focal length of the first lens group, and $f_t$ denotes a focal length of the zoom lens system at a telephoto end,
   wherein the fourth lens group comprises a cemented lens and an independent lens having at least one aspherical surface.

2. The zoom lens system of claim 1, wherein the fourth lens group satisfies a following condition:

$$0.12 < |f_{43}/f_{4142}| < 0.35,$$

where $f_{43}$ denotes a focal length of the independent lens of the fourth lens group, and $f_{4142}$ denotes a focal length of the cemented lens of the fourth lens group.

3. The zoom lens system of claim 1, wherein the fourth lens group satisfies a following condition:

$$V_{T4} < 50,$$

where $V_{T4}$ denotes an average value of Abbe's numbers of the lenses included in the fourth lens group.

4. A zoom lens system comprising, sequentially from an object side to an image side:
- a first lens group having a positive refractive power;
- a second lens group having a negative refractive power;
- a third lens group having a positive refractive power; and
- a fourth lens group having a negative refractive power,
wherein a zooming operation is performed by moving the second lens group and the fourth lens group under a following condition:

$$0.25 < f1/ft < 0.31,$$

where f1 denote a focal length of the first lens group, and ft denotes a focal length of the zoom lens system at a telephoto end,
wherein the second lens group comprises a first negative lens, a second negative lens, and a positive lens having at least one aspherical surface.

5. The zoom lens system of claim 4, wherein the first negative lens, the second negative lens, and the positive lens are respectively independent lenses.

6. The zoom lens system of claim 4, wherein the first negative lens, the second negative lens, and the positive lens of the second lens group satisfy a following condition:

$$0.8 < (V_{21} + V_{23})/V_{22} < 1.2,$$

where $V_{21}$ denotes an Abbe's number of the first negative lens, $V_{22}$ denotes an Abbe's number of the second negative lens, and $V_{23}$ denotes an Abbe's number of the positive lens.

7. The zoom lens system of claim 1, wherein a focal length of the second lens group satisfies a following condition:

$$1.0 < |f_2/f_w| < 2.0,$$

where $f_2$ denotes a focal length of the second lens group, and $f_w$ denotes a focal length of the zoom lens system at a wide-angle end.

8. The zoom lens system of claim 1, wherein the first lens group comprises at least four lenses.

9. The zoom lens system of claim 8, wherein the third lens group comprises at least three lenses.

10. The zoom lens system of claim 1, wherein the zoom lens system satisfies a following condition:

$$30 \leq f_t/f_w,$$

where $f_t$ denotes a focal length of the zoom lens system in a telephoto end, and $f_w$ denotes a focal length of the zoom lens in a wide-angle end.

11. A zoom lens system comprising, sequentially from an object side to an image side:
- a first lens group having a positive refractive power;
- a second lens group having a negative refractive power;
- a third lens group having a positive refractive power; and
- a fourth lens group having a negative refractive power,
wherein a zooming operation is performed by moving the second lens group and the fourth lens group, and the fourth lens group comprises a cemented lens and an independent lens and satisfies a following condition:

$$0.12 < |f_{43}/f_{4142}| < 0.35,$$

where $f_{43}$ denotes a focal length of the independent lens of the fourth lens group, and $f_{4142}$ denotes a focal length of the cemented lens of the fourth lens group.

12. The zoom lens system of claim 11, wherein the independent lens of the fourth lens group comprises at least one aspherical surface.

13. The zoom lens system of claim 11, wherein the fourth lens group satisfies a following condition:

$$V_{T4} < 50,$$

where $V_{T4}$ denotes an average value of Abbe's numbers of the lenses included in the fourth lens group.

14. The zoom lens system of claim 11, wherein the first lens group satisfies a following condition:

$$0.25 < f_1/f_t < 0.31,$$

where $f_1$ denote a focal length of the first lens group, and $f_t$ denotes a focal length of the zoom lens system at a telephoto end.

15. The zoom lens system of claim 11, wherein the second lens group comprises a first negative lens, a second negative lens, and a positive lens having at least one aspherical surface, and the first negative lens, the second negative lens, and the positive lens are respectively independent lenses and satisfy a following condition:

$$0.8 < (V_{21} + V_{23})/V_{22} < 1.2,$$

where $V_{21}$ denotes an Abbe's number of the first negative lens, $V_{22}$ denotes an Abbe's number of the second negative lens, and $V_{23}$ denotes an Abbe's number of the positive lens.

16. The zoom lens system of claim 11, wherein a focal length of the second lens group satisfies a following condition:

$$1.0 < |f_2/f_w| < 2.0,$$

where $f_2$ denotes a focal length of the second lens group, and $f_w$ denotes a focal length of the zoom lens system at a wide-angle end.

17. The zoom lens system of claim 11, wherein the first lens group comprises at least four lenses.

18. The zoom lens system of claim 11, wherein the third lens group comprises a plurality of lenses.

19. The zoom lens system of claim 11, wherein the zoom lens system satisfies a following condition:

$$30 \leq f_t/f_w,$$

where $f_t$ denotes a focal length of the zoom lens system in a telephoto end, and $f_w$ denotes a focal length of the zoom lens in a wide-angle end.

* * * * *